(12) United States Patent
Song et al.

(10) Patent No.: US 12,153,715 B2
(45) Date of Patent: Nov. 26, 2024

(54) METHOD FOR CONTROLLING PERMISSION OF APPLICATION AND ELECTRONIC DEVICE SUPPORTING THE SAME

(71) Applicant: Samsung Electronics Co., Ltd., Gyeonggi-do (KR)

(72) Inventors: Hansang Song, Gyeonggi-do (KR); Bumhan Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 329 days.

(21) Appl. No.: 17/701,820

(22) Filed: Mar. 23, 2022

(65) Prior Publication Data

US 2022/0309187 A1    Sep. 29, 2022

Related U.S. Application Data

(63) Continuation of application No. PCT/KR2022/003977, filed on Mar. 22, 2022.

(30) Foreign Application Priority Data

Mar. 24, 2021   (KR) .................. 10-2021-0038136

(51) Int. Cl.
G06F 21/62          (2013.01)
(52) U.S. Cl.
CPC ................. *G06F 21/6281* (2013.01)
(58) Field of Classification Search
CPC .................................................. G06F 21/6281
USPC ........................................................... 726/29
See application file for complete search history.

(56) References Cited

U.S. PATENT DOCUMENTS

| 7,865,444 B1 * | 1/2011 | Biswas | G06F 21/105 |
| | | | 705/79 |
| 9,787,685 B2 | 10/2017 | Zhang et al. | |
| 10,572,674 B2 | 2/2020 | Lee et al. | |
| 10,834,091 B2 | 11/2020 | Deninno et al. | |

(Continued)

FOREIGN PATENT DOCUMENTS

| JP | 2012-221216 A | 11/2012 |
| KR | 10-2009-0000076 A | 1/2009 |

(Continued)

OTHER PUBLICATIONS

International Seach Report Dated Jul. 4, 2022.

*Primary Examiner* — Michael S McNally
(74) *Attorney, Agent, or Firm* — Cha & Reiter, LLC

(57) ABSTRACT

An electronic device and permission control method are disclosed. The electronic device includes a display, a communication circuitry, a memory and a processor. The processor implements the method, including: receiving a first evaluation regarding usage of an access permission by at least one application from a server, via the communication circuitry, generating usage information indicating historical usage of the access permission by the at least one application, generating a second evaluation of the access permission granted to the at least one application, based at least on the usage information, determining an evaluation result based on at least one of the first evaluation or the second evaluation, and determining whether to display a user notification regarding the access permission, based on the evaluation result.

20 Claims, 8 Drawing Sheets

(56) References Cited

U.S. PATENT DOCUMENTS

| | | | |
|---|---|---|---|
| 2005/0044546 A1* | 2/2005 | Niebling | H04L 63/10 |
| | | | 717/172 |
| 2006/0026105 A1* | 2/2006 | Endoh | G06F 21/1079 |
| | | | 705/59 |
| 2011/0289003 A1* | 11/2011 | Womack | G06F 21/105 |
| | | | 705/310 |
| 2012/0144384 A1 | 6/2012 | Baek | |
| 2013/0031642 A1* | 1/2013 | Dwivedi | G06F 21/105 |
| | | | 726/29 |
| 2013/0144755 A1* | 6/2013 | Mowatt | H04W 4/60 |
| | | | 705/26.41 |
| 2015/0373024 A1 | 12/2015 | Zhang et al. | |
| 2016/0036786 A1* | 2/2016 | Gandhi | H04W 12/06 |
| | | | 713/168 |
| 2016/0232374 A1 | 8/2016 | Huang et al. | |
| 2016/0328569 A1 | 11/2016 | Lee et al. | |
| 2017/0061136 A1 | 3/2017 | Fung et al. | |
| 2018/0052696 A1* | 2/2018 | Riscutia | G06F 9/451 |
| 2018/0248889 A1 | 8/2018 | Deninno et al. | |
| 2021/0160249 A1 | 5/2021 | Deninno et al. | |

FOREIGN PATENT DOCUMENTS

| | | |
|---|---|---|
| KR | 10-2012-0063315 A | 6/2012 |
| KR | 10-2013-0116409 A | 10/2013 |
| KR | 10-2014-0121075 A | 10/2014 |
| KR | 10-2016-0010388 A | 1/2016 |
| KR | 10-2016-0131886 A | 11/2016 |
| KR | 10-2021-0025885 A | 3/2021 |

\* cited by examiner

METHOD FOR CONTROLLING PERMISSION OF APPLICATION AND ELECTRONIC DEVICE SUPPORTING THE SAME

CROSS-REFERENCE TO RELATED APPLICATION(S)

This application is a Continuation of International Application No. PCT/KR2022/003977, filed on Mar. 22, 2022, which claims priority to Korean Patent Application No. 10-2021-0038136, filed on Mar. 24, 2021 in the Korean Intellectual Property Office, the disclosures of which are herein incorporated by reference.

TECHNICAL FIELD

Certain embodiments of the disclosure relate to a method for controlling a permission of an application and an electronic device supporting the same.

BACKGROUND

An electronic device, such as a smartphone or a tablet PC, are capable of executing a diversity of applications. Typically, an electronic device downloads an installation file for an application to be installed from an external server. Then, the electronic device executes the downloaded installation file to install the application. In many cases, applications are pre-loaded into the electronic device by the manufacturer.

When a particular application is executed, execution thereof may utilize a specified function, a module, an internal device, or a hardware resource of the electronic device, and accordingly, sometimes the application may generate a request for permission to access and use specific data (hereinafter, referred to as a "permission usage request"). For example, when the application is installed, permission may be requested by the application to access a location service and receive location information, or to operationally access to a camera, or retrieve one or more specific files of data. A different set of permissions may be desired according to the respective components and/or data involved with executing the application.

The electronic device may display a visual notification (e.g., as part of a user interface) prompting a user to grant or deny access permission for the application. Subsequently, the electronic device may receive a user input, and grant or deny access permissions to the application, as indicated by the user input.

When the application is installed and/or executed in an electronic device, problems may arise in which the application requests more permissions than necessary. Furthermore, it is often difficult or convoluted to rescind access permission to an application, which it was previously granted to the same. Furthermore, there may arise a situation in which an application has attained more access permissions than necessary. When the application has a broad spectrum of file access, there is an increased risk that personal information will be leaked and/or illicitly accessed. Thus, there is a need to better control and limit the access permissions granted unto applications.

SUMMARY

The present disclosure provides an electronic device that is capable of evaluating access permission for an application using various criteria, and generating notifications that may better inform a user as to whether to grant access permissions.

In certain embodiments of the disclosure, an electronic device is disclosed. The electronic device may include a display, a communication module, a memory, and a processor. The processor is configured to: receive a first evaluation regarding usage of an access permission by at least one application from a server, via the communication module, generate usage information indicating historical usage of the access permission by the at least one application, generate a second evaluation of the access permission granted to the at least one application, based at least on the usage information, determine an evaluation result based on at least one of the first evaluation or the second evaluation, and determine whether to display a user notification regarding the access permission, based on the evaluation result.

In certain embodiments of the disclosure, a permission control method in an electronic device is disclosed. The method may include: receiving, from a server via a communication circuit, a first evaluation regarding usage of an access permission by at least one application, generating, via at least one processor, usage information indicating historical usage of the access permission by the at least one application, generating a second evaluation of the access permission granted to the at least one application, based at least on the usage information, determining an evaluation based on at least one of the first evaluation or the second evaluation, and displaying, via a display, a user regarding the access permission, based on the evaluation result.

The electronic device, according to certain embodiments of the disclosure, may generate a notification indicating whether a set access permission for a particular application is appropriate, as based on various algorithmic evaluations according to category, user-details, and/or usability of the application.

The electronic device, according to certain embodiments of the disclosure, may evaluate whether an existing access permission granted to an application is appropriate. The evaluation and analysis may be executed externally via machine-learning by another device. Further, a secondary evaluation of the access permission may be executed local and/or internal machine-learning.

The electronic device, according to certain embodiments disclosed in the disclosure, may further update an existing evaluation according to, for example, application category, usage characteristics, and usability of the application, etc. These analyses may be based on the results of a manual grant of access permission via user input. Thus, there may be improvements in the reliability of evaluation criterion for considering one or more access permissions for an application.

With regard to description of drawings, the same or similar denotations may be used for the same or similar components.

DETAILED DESCRIPTION

Hereinafter, certain embodiments of the disclosure are described with reference to the accompanying drawings. Accordingly, those of ordinary skill in the art will recognize that modification, equivalent, and/or alternative on the certain embodiments described herein can be variously made without departing from the scope of the present disclosure. With regard to description of drawings, similar denotations may be used for similar components.

Figure 1:
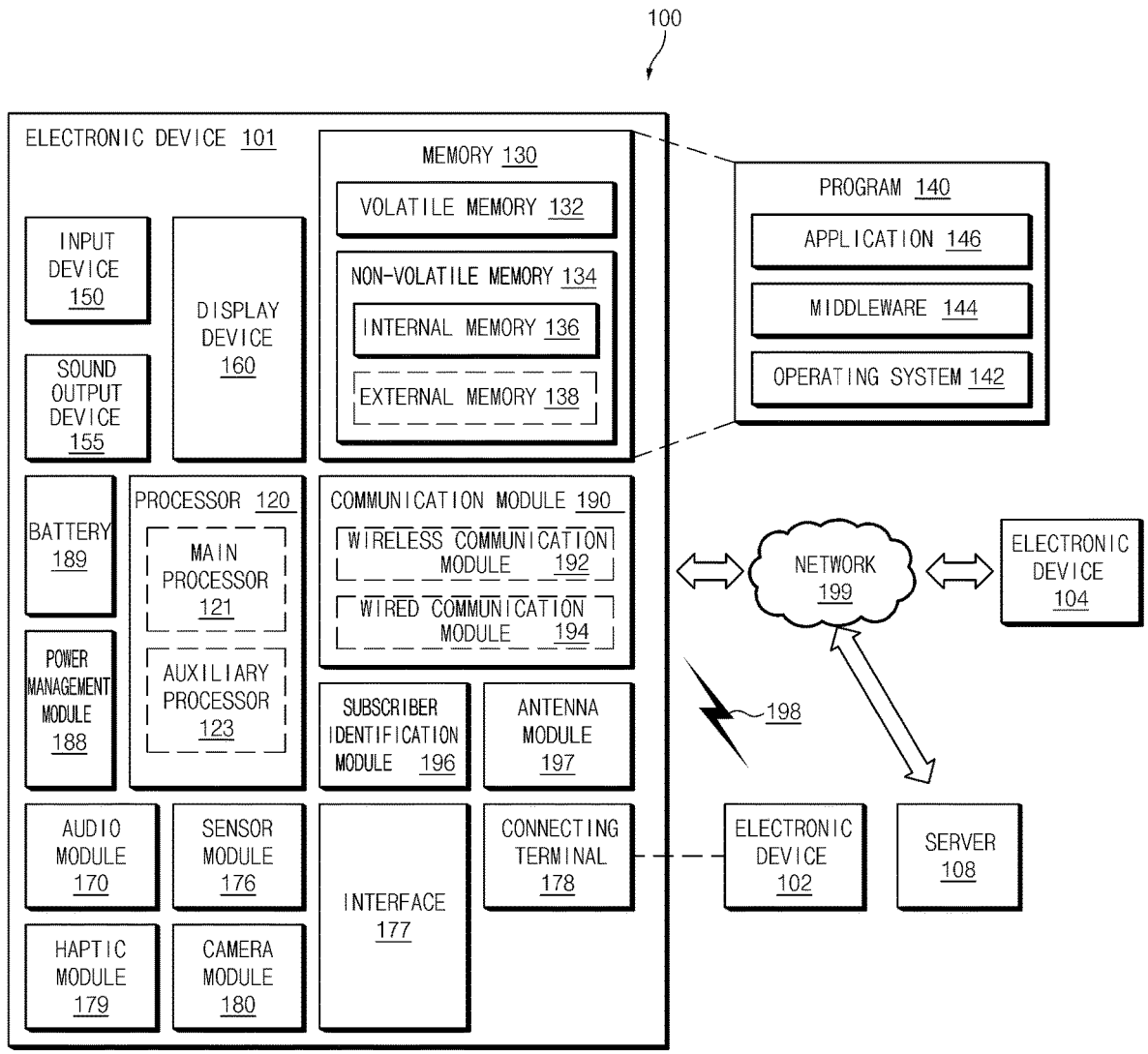
FIG. 1 is a block diagram illustrating an electronic device in a network environment according to certain embodiments.

FIG. 1 is a block diagram of an electronic device 101 in a network environment 100 according to certain embodiments. Electronic devices according to certain embodiments disclosed in the disclosure may be various types of devices. An electronic device may include at least one of, for example, a portable communication device (e.g., a smartphone, a computer device (e.g., a PDA: personal digital assistant), a tablet PC, a laptop PC, a desktop PC, a workstation, or a server), a portable multimedia device (e.g., e-book reader or MP3 player), a portable medical device (e.g., heart rate, blood sugar, blood pressure, or body temperature measuring device), a camera, or a wearable device. The wearable device may include at least one of an accessory type device (e.g., watches, rings, bracelets, anklets, necklaces, glasses, contact lenses, or head wearable device head-mounted-device (HMD)), a fabric or clothing integral device (e.g., an electronic clothing), a body-attached device (e.g., skin pads or tattoos), or an bio implantable circuit. In some embodiments, the electronic device may include at least one of, for example, a television, a DVD (digital video disk) player, an audio device, an audio accessory device (e.g., a speaker, headphones, or a headset), a refrigerator, an air conditioner, a cleaner, an oven, a microwave oven, a washing machine, an air purifier, a set top box, a home automation control panel, a security control panel, a game console, an electronic dictionary, an electronic key, a camcorder, or an electronic picture frame.

In another embodiment, the electronic device may include at least one of a navigation device, GNSS (global navigation satellite system), an EDR (event data recorder (e.g., black box for vehicle/ship/airplane), an automotive infotainment device (e.g., vehicle head-up display), an industrial or home robot, a drone, ATM (automated teller machine), a POS (point of sales) instrument, a measurement instrument (e.g., water, electricity, or gas measurement equipment), or an Internet of Things device (e.g. bulb, sprinkler device, fire alarm, temperature regulator, or street light). The electronic device according to the embodiment of the disclosure is not limited to the above-described devices. Further, for example, as in a smart phone equipped with measurement of biometric information (e.g., a heart rate or blood glucose) of an individual, the electronic device may have a combination of functions of a plurality of devices. In the disclosure, the term "user" may refer to a person using the electronic device or a device (e.g., an artificial intelligence electronic device) using the electronic device.

The electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Figure 2:
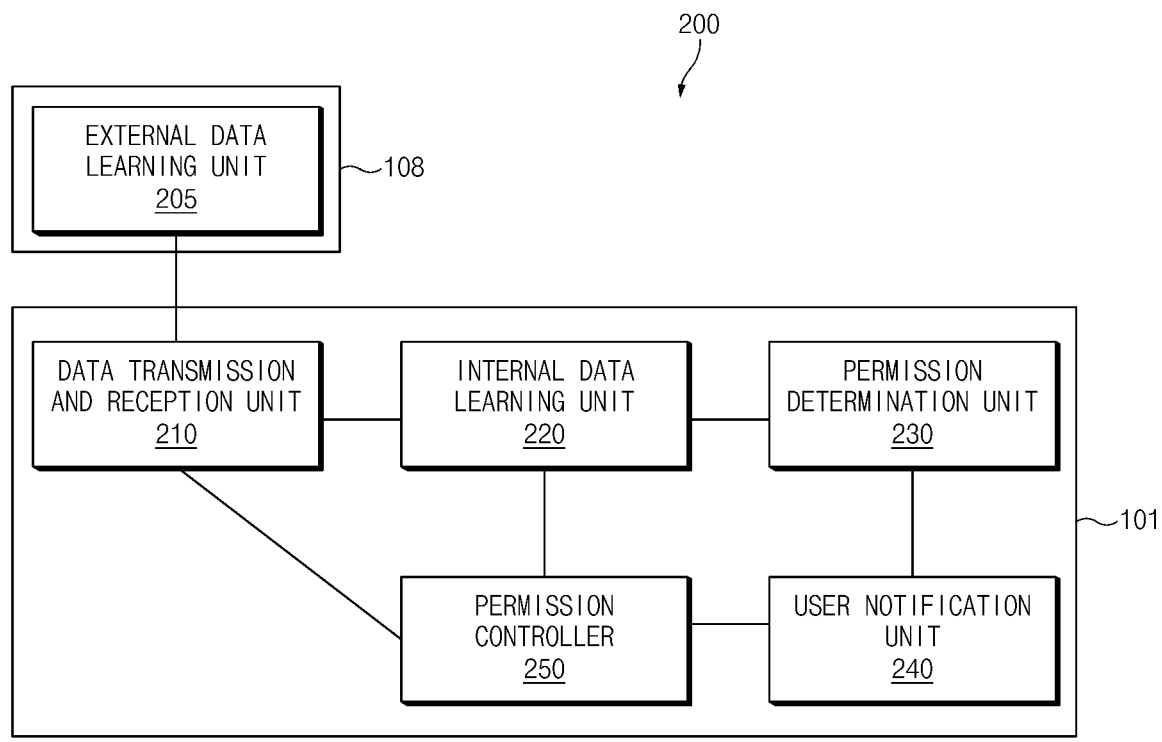
FIG. 2 illustrates a permission evaluation system according to certain embodiments.

FIG. 2 illustrates a permission evaluation system according to certain embodiments.

Referring to FIG. 2, a permission evaluation system 200 may include a server 108 (e.g., a server 108 of FIG. 1) and an electronic device 101 (e.g., an electronic device 101 of FIG. 1).

The server 108 may include an external data learning unit 205. The external data learning unit 205 may primarily evaluate a permission utilized in an application based on various criteria. For example, the server 108 may be a server which operates an app market (e.g., Android-Play Store or iOS-App Store).

According to an embodiment, the external data learning unit 205 may generate first permission evaluation information (or a first evaluation) including at least one of first evaluation information (or a first sub-evaluation) about a category of the application, second evaluation information (or a second sub-evaluation) about a user who uses the application, or third evaluation information (or a third sub-evaluation) about a usage pattern of the application.

Hereinafter, a description will be given of the case where the server 108 determines the permission utilized in the application as one of a positive evaluation/a negative evaluation, but not limited thereto. For example, the server 108 may determine a plurality of reference values as "one of a positive evaluation/a normal evaluation/a negative evaluation" or "one of a very positive evaluation/a positive evaluation/a negative evaluation/or a very negative evaluation" or may calculate and use an evaluation score. Alternatively, the server 108 may determine and transmit at least one reference value capable of evaluation the permission utilized in the application to the electronic device 101.

According to an embodiment, the server 108 may generate first evaluation information about a category (e.g., finance, game, health, education, sociality, map, or shopping) of the application (hereinafter, referred to as an "external category evaluation"). The category of the application may be the same as classification of the application applied in an app market (e.g., Android-Play Store or iOS-App Store). The server 108 may identify a permission utilized in each of applications included in the same category. The server 108 may determine a permission utilized in applications of a reference rate or more (or greater than the reference rate) in the category as a positive evaluation and may determine a permission utilized in applications of less than the reference rate (or the reference rate or less) as a negative evaluation. Hereinafter, a description will be given of a 'finance' category, but not limited thereto.

For example, when a reference value of the positive evaluation or the negative evaluation is 90% and when 90% or more of apps which belong to the 'finance' category request a permission to 'use the phone', the server 108 may determine the permission to 'use the phone' for the app which belongs to the 'finance' category as the positive evaluation. Alternatively, when apps of less than 90% among the apps which belong to the 'finance' category requests a permission for 'position information', the server 108 may determine the permission for 'position information' for the app which belongs to the 'finance' category as the negative evaluation.

According to an embodiment, the server 108 may generate second evaluation information about a user who uses the application (hereinafter, referred to as an "external user evaluation"). The server 108 may obtain the result of granting a permission of a specified application in terminals of several users and may evaluate a permission utilized in applications. The server 108 may determine a permission granted in a terminal of a user of a reference rate or more (or greater than the reference rate) among all users or users of a group according to a specific criterion (e.g., a specific country, a specific area, a specific age group, or users who install five or more applications in the same category) as the positive evaluation and may determine a permission which is not granted in a terminal of a user of less than the reference rate (or the reference rate or less) as the negative evaluation.

For example, when the reference value of the positive evaluation or the negative evaluation is 90% and when 90% or more of all users (unspecified individuals) grant the permission to 'use the phone' in an application of Bank A, the permission to 'use the phone' for the application of Bank A may be determined as the positive evaluation. Alternatively, when 90% or more of all users of a specified country grant the permission to 'use the position' in the application of Bank A, the permission 'to use the phone' may be determined as an allowable permission for the application of Bank A.

For another example, when 90% of users selected based on a specific criterion grant the permission to 'use the phone' in the application of Bank A, the permission to 'use the phone' may be determined as the positive evaluation for the application of Bank A. The specific criterion may be a criterion such as a user who installs five or more bank apps, a user who completes his or her authentication, a specific user, and a user registered using an SNS/address book.

According to an embodiment, the server 108 may generate third evaluation information about a usage pattern of the application (hereinafter, referred to as an "external usability evaluation"). The server 108 may collect the number of times or a time where or when a permission utilized in the application is used in each terminal. When the permission utilized in the application is used above a predetermined number of times (greater than the predetermined number of times) or is used above a specified time (or greater than the specified time) in each terminal, the server 108 may determine the corresponding permission as the positive evaluation. On the other hand, when the permission utilized in the application is used less than the predetermined number of times (below the predetermined number of times) or is used less than specified time (or below the specified time) in each terminal, the server 108 may determine the corresponding permission as the negative evaluation.

For example, when continuing accessing the permission to 'use position' while executing the permission 'to use the position' in a navigation application, the server 108 may determine the use of the permission to 'use the position' in the navigation application as the positive evaluation.

For another example, when accessing the permission 'to use the position' within 10 minutes less than five times in the application of Bank A, the server 108 may determine the use of the permission to 'use the phone' within five minutes less than five times in the application of Bank A as the positive evaluation.

According to an embodiment, the external usability evaluation may include a reference value associated with the number of uses or a usage time of the permission, rather than an evaluation result such as the positive evaluation or the negative evaluation.

According to certain embodiments, to analyze many apps and collect and reflect evaluation results of several users, the server 108 may receive and reflect the result of a permission granted or denied in a terminal of each user. The server 108 may update an external category evaluation, an external user evaluation, or an external usability evaluation using a statistical method or AI learning.

According to certain embodiments, the server 108 may assign a weight to the external category evaluation, the external usability evaluation, or the external user evaluation to generate first permission evaluation information. For example, the server 108 may more assign a weight to the external user evaluation than the external category evaluation and the external usability evaluation to generate the first permission evaluation information.

According to certain embodiments, the electronic device 101 may evaluate a permission of the application using various criteria and may notify a user of appropriateness of setting the permission. At least some of operations of a component in the electronic device 101 may be operations of a processor 120 in FIG. 1.

According to certain embodiments, the electronic device 101 may include a data transmission and reception unit 210, an internal data learning unit 220, a permission determination unit 230, a user notification unit 240, and a permission controller 250. FIG. 2 is classification according to a function associated with permission control, but not limited thereto. At least some of operations of the data transmission and reception unit 210, the internal data learning unit 220, the permission determination unit 230, the user notification unit 240, and the permission controller 250 may be operations of the processor 120 of FIG. 1.

The data transmission and reception unit (or a communication circuit) 210 (e.g., a communication module 190 of FIG. 1) may receive the first permission evaluation information generated by the server 108. The data transmission and reception unit 210 may deliver the first permission evaluation information to the internal data learning unit 220.

The first permission evaluation information may include at least one of an external category evaluation about a category of the application, an external user evaluation about a user who uses the application, or an external usability evaluation about a usage pattern of the application.

According to an embodiment, the first permission evaluation information may include the result of evaluating a permission utilized in the application. For example, the first permission evaluation information may include the result of evaluating the permission of the application as "one of a positive evaluation/a negative evaluation", "one of a positive evaluation/a normal evaluation/a negative evaluation", or "one of a very negative evaluation/a positive evaluation/a negative evaluation/a very negative evaluation".

According to another embodiment, the first permission evaluation information may include an evaluation criterion for the permission utilized in the application. For example, the first permission evaluation information may include a reference value to determine the use of the corresponding permission less than five times within 10 minutes as the positive evaluation.

According to certain embodiments, the data transmission and reception unit 210 may transmit at least one of granted or denied permission information of the application in the electronic device 101, user identification information, terminal identification information, or internal evaluation information to the server 108.

The internal data learning unit 220 may generate second permission evaluation information (or a second evaluation) based on information about the permission of the application (hereinafter, referred to as "permission usage information"), which is obtained in the electronic device 101. For example, the permission usage information may include first history information about installing, running, or deleting the application or second history information about a permission utilized in the application, whether to grant the permission, the number of uses for the permission, or a usage time for the permission.

The second permission evaluation information may include at least one of fourth evaluation information (or a fourth sub-evaluation) about the category of the application (hereinafter, referred to as an "internal category evaluation"), fifth evaluation information (or a fifth sub-evaluation) about a user linked to the electronic device 101 (hereinafter, referred to as an "internal user evaluation"), or sixth evaluation information (or a sixth sub-evaluation) about a usage pattern of the application installed in the electronic device 101 (hereinafter, referred to as an "internal usability evaluation").

According to certain embodiments, the internal data learning unit 220 may identify a category of applications installed in the electronic device 101. The internal data learning unit 220 may obtain statistical information about a permission utilized for each category in the electronic device 101, a granted permission, and a permission which is not granted. The internal data learning unit 220 may generate an internal category evaluation based on the statistical information.

According to certain embodiments, the internal data learning unit 220 may obtain the first history information about installing, running, or deleting the application. The internal data learning unit 220 may generate an internal user evaluation based on the first history information of the application. For example, when the application is initially installed, the internal data learning unit 220 may generate an internal user evaluation without reflecting a separate weight. On the other hand, when an application having a previously installed history is installed again, the internal data learning unit 220 may reflect a weight in a permission granted in the previous installation by the user to generate the internal user evaluation.

According to certain embodiments, the internal data learning unit 220 may extract the second history information about whether to grant the permission while the application is running, the number of uses of the permission, or a usage time of the permission. The internal data learning unit 220 may generate the internal user evaluation based on the second history information.

For example, when the permission to "use the position" has never been used while the application of Bank A is running in the electronic device 101, the internal data learning unit 220 may reflect a weight in the permission to "use the position" of the application of Bank A as an unnecessary permission to generate the internal usability evaluation.

According to certain embodiments, the permission usage information used in the internal data learning unit 220 may be transmitted to the server 108 or a separate server as a profile for each Individual. When the application is deleted and is then installed again, when the terminal is initialized, or when the user replaces the terminal, the internal data learning unit 220 may reuse stored data to accumulate learning data, thus enhancing reliability of a user notification associated with the permission.

According to certain embodiments, when a neural processing unit (NPU) of the electronic device 101 is included, analysis and learning of the internal data learning unit 220 may be performed using AI learning.

According to certain embodiments, the permission determination unit 230 may apply the first permission evaluation information and the second permission evaluation information determined by the internal data learning unit 220 in a complex manner to determine the result of evaluating the permission utilized in the application.

According to an embodiment, the permission determination unit 230 may apply a category evaluation (an external category evaluation and an internal category evaluation), a user evaluation (an external user evaluation and an internal user evaluation), or a usability evaluation (an external usability evaluation or an internal usability evaluation) to various priorities or weights to determine the result of finally evaluating the permission.

For example, when the application is initially installed or uses a specific permission for the first time, the permission determination unit 230 may determine a positive evaluation or a negative evaluation of the corresponding permission on the basis of the category evaluation or the user evaluation.

For another example, when the application is running to use a specific permission, the permission determination unit 230 may determine a positive evaluation or a negative evaluation of the corresponding permission on the basis of the usability evaluation or the user evaluation.

The user notification unit 240 may display a user notification based on the evaluation result of the permission determination unit 230. For example, when the permission of the application is determined as the negative evaluation, the user notification unit 240 may display the user notification on a display. The user notification may be output in a form such as a pop-up message or a status bar message.

According to certain embodiments, the user notification unit 240 may display a list of applications and may provide the user with the result of evaluating the permission utilized in each application in various manners.

The permission controller 250 may receive a user input using the user notification or a user interface output from the user notification unit 240 and may grant or deny a permission of the application in response to the user input.

According to certain embodiments, the permission controller 250 may deliver a permission setting result by the user input to the internal data learning unit 220 to learn it.

According to certain embodiments, the permission controller 250 may deliver a permission setting result by the user input to the data transmission and reception unit 210 to transmit it to the server 108. The server 108 may update the first permission evaluation information based on the received information.

According to certain embodiments, when the user changes the permission of the application in a setting menu of the electronic device 101, the permission controller 250 may deliver the changed result to the internal data learning unit 220 or the data transmission and reception unit 210.

Figure 3:
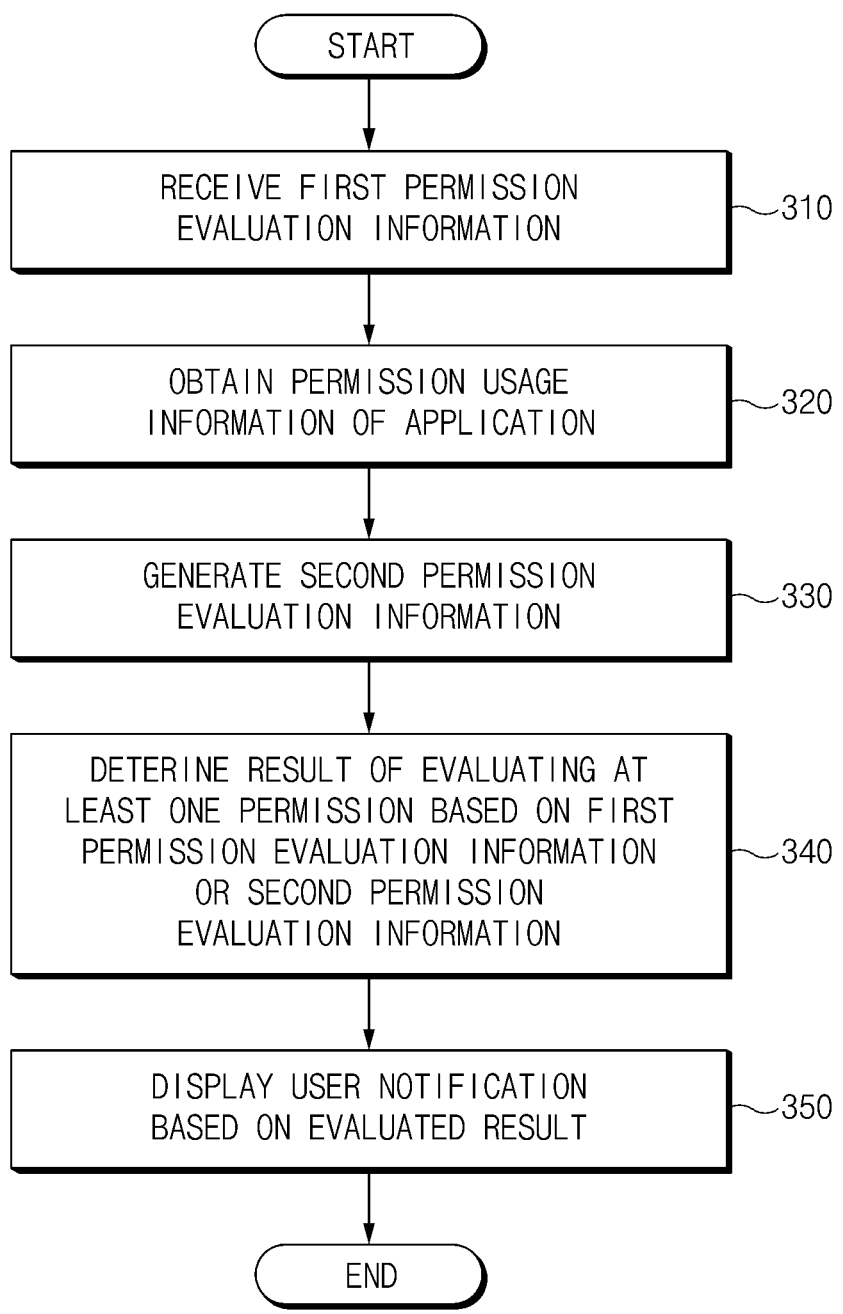
FIG. 3 illustrates a method for controlling a permission of an application according to certain embodiments.

FIG. 3 illustrates a method for controlling a permission of an application according to certain embodiments.

Referring to FIG. 3, in operation 310, a processor 120 may receive first permission evaluation information about at least one application from a server 108 through a communication module (e.g., a communication module 190 of FIG. 1 or a data transmission and reception unit 210 of FIG. 2). The at least one application may be an application installed or to-be-installed in the electronic device 101.

The first permission evaluation information may include at least one of an external category evaluation about a category of the at least one application, an external user evaluation about a user who uses the at least one application, or an external usability evaluation about a usage pattern of the at least one application.

According to an embodiment, when the application is installed, the processor 120 may receive the first permission evaluation information. According to another embodiment, when executing the application after the application is installed, the processor 120 may receive the first permission evaluation information. According to another embodiment, when initially using a specific permission after running the application, the processor 120 may receive the first permission evaluation information.

In operation 320, the processor 120 may obtain permission usage information of the at least one application in the electronic device 101. The permission usage information may include first history information about installing, executing, or deleting the application, or second history information about an access permission utilized by the application, whether to grant the access permission, a count of the number of utilizes of the access permission, or a total usage time in which the access permission was used by the application.

In operation 330, the processor 120 may generate second permission evaluation information based on the permission usage information. The second permission evaluation information may include at least one of an internal category evaluation, an internal user evaluation, or an internal usability evaluation.

In operation 340, the processor 120 may determine an evaluated result (e.g., an evaluation result) regarding the grant of access permission to the application, based on the first permission evaluation information or the second permission evaluation information.

When the application is installed and is executed for the first time, the processor 120 may first apply a user evaluation (e.g., an external user evaluation or an internal user evaluation). When no user evaluation exists (e.g., no user evaluation is stored in the memory), the processor 120 may apply a category evaluation (e.g., an external category evaluation or an internal category evaluation) to determine a positive evaluation or a negative evaluation of the access permission to the application.

For another example, the processor 120 may compare a score calculated by applying a different weight to a category evaluation (e.g., an external category evaluation or an internal category evaluation), a user evaluation (e.g., an external user evaluation or an internal user evaluation), or a usability evaluation (e.g., an external usability evaluation or an internal usability evaluation) with a predetermined reference value, to determine a positive evaluation or a negative evaluation of the permission. The weight may vary with the application or may be differently set according to a category of the application.

For another example, the processor 120 may compare a score calculated by applying different weights to the first permission evaluation information and the second permission evaluation information with the predetermined reference value to determine the positive evaluation or the negative evaluation of the permission (e.g., a weight of 60% to the first permission evaluation information and a weight of 40% to the second permission evaluation information).

According to certain embodiments, the processor 120 may manage a history of evaluations of the access permission, based on the first permission evaluation information, or the second permission evaluation information.

In operation 350, the processor 120 may display a user notification for the access permission of the application based on the evaluated result. For example, when the evaluation result is negative (e.g., recommending against granting access permission to the application), a guidance message expressing the same (e.g., "Most people don't allow this permission.") may be added and displayed via a pop-up window, which may include elements selectable by a user to configure the access permission.

For another example, when the count of uses of a specified permission is greater than a reference value, and while the application is executing, a pop-up window may be displayed including a guidance message generated in accordance with the negative evaluation (e.g., "location information is being overused"). The pop-up window may include a display button selectable by a user to change the grant of access permission.

Figure 4:
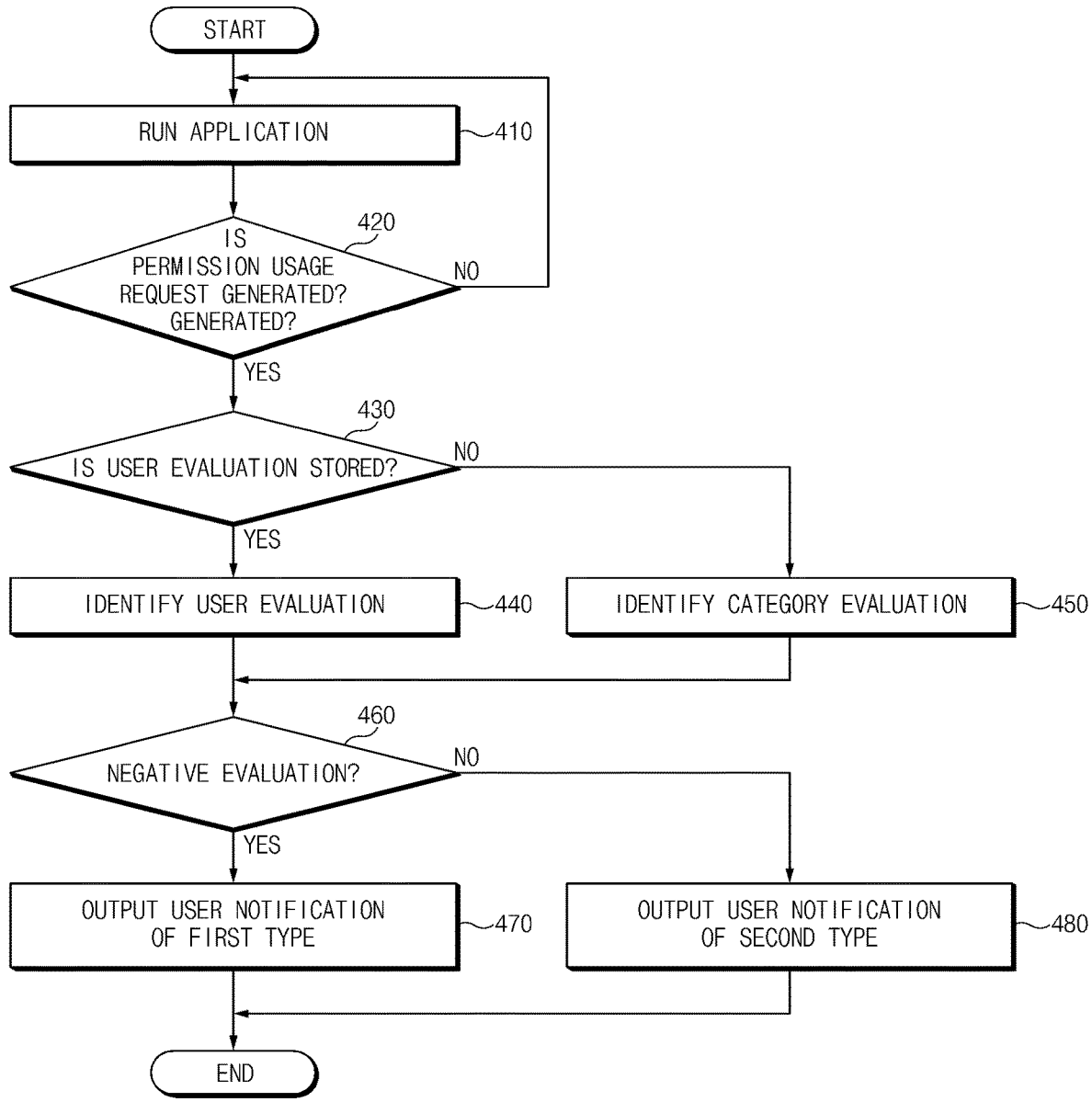
FIG. 4 illustrates a permission control method when a permission usage request is generated in an application according to certain embodiments.

FIG. 4 illustrates a permission control method when a permission usage request is generated in an application according to certain embodiments.

Referring to FIG. 4, in operation 410, a processor 120 may execute an application. For example, the processor 120 may download, install, and execute an installation file (e.g., an "APK" file). Alternatively, the processor 120 may execute a previously installed application.

In operation 420, the processor 120 may identify whether an access permission usage request is generated by the application. The access permission usage request may include a request by the application to access a specified function, module, internal component, or hardware resource of the electronic device 101, or to access specific piece or set of data. The access permission request may be generated simultaneously with execution of the application. Alternatively, the permission usage request may be generated after execution of the application, at a time point in which a permission is needed for the application to execute some function therein.

When the permission usage request is generated, in operation 430, the processor 120 may determine whether a user evaluation is extant, such as by being prestored in the memory. The user evaluation may include an external user evaluation or an internal user evaluation.

When the user evaluation is stored, in operation 440, the processor 120 may identify an evaluated result based on the user evaluation. The user evaluation may include an external user evaluation or an internal user evaluation.

When the user evaluation is not stored in the memory, in operation 450, the processor 120 may identify an evaluated result based on a category evaluation. The category evaluation may include an external category evaluation or an internal category evaluation.

In operation 460, the processor 120 may identify whether the evaluated result by the user evaluation or the category evaluation is a negative evaluation.

For example, when 90% or less of users who install the corresponding application deny the access permission request by the application, an "external user evaluation" of the access permission request by the application may be negative. Alternatively, in some examples, the external user evaluation of the access permission request may be positive (e.g., meaning that most users above some threshold accept the access permission request), but nevertheless, the evaluation may be changed to negative by an "internal" user evaluation.

For another example, when less than 30% of applications belonging to a same category as a current application actually request the access permission in question, the external category evaluation may indicate a negative result.

When the evaluated result by the user evaluation or the category evaluation is the negative evaluation, in operation 470, the processor 120 may output a user notification of a first type including a guidance message pertaining to the result. For example, the user notification of the first type may be "Most users do not allow this permission." Alternatively, the guidance message may be, "This permission seems excessive for a finance application."

When the evaluated result by the user evaluation or the category evaluation is positive, then in operation 480, the processor 120 may output a user notification of a second type recommending granting/configuring an access permission. The user notification of the second type may not include a guidance message about the evaluated result and may include a button selectable to set an access permission.

According to certain embodiments, the processor 120 may receive a user input for a permission setting, using the user notification of the first type or the user notification of the second type. The processor 120 may grant or deny the permission in response to a user input. The processor 120 may transmit the access permission setting to a server 108, to be used as first permission evaluation information or be used as internal second permission evaluation information.

FIG. 4 illustrates the case where a weight is applied to the user evaluation, such that it has a degree of precedence over the category evaluation, but not limited thereto. For example, the processor 120 may display results by the user evaluation and the category evaluation at the same time.

Figure 5:
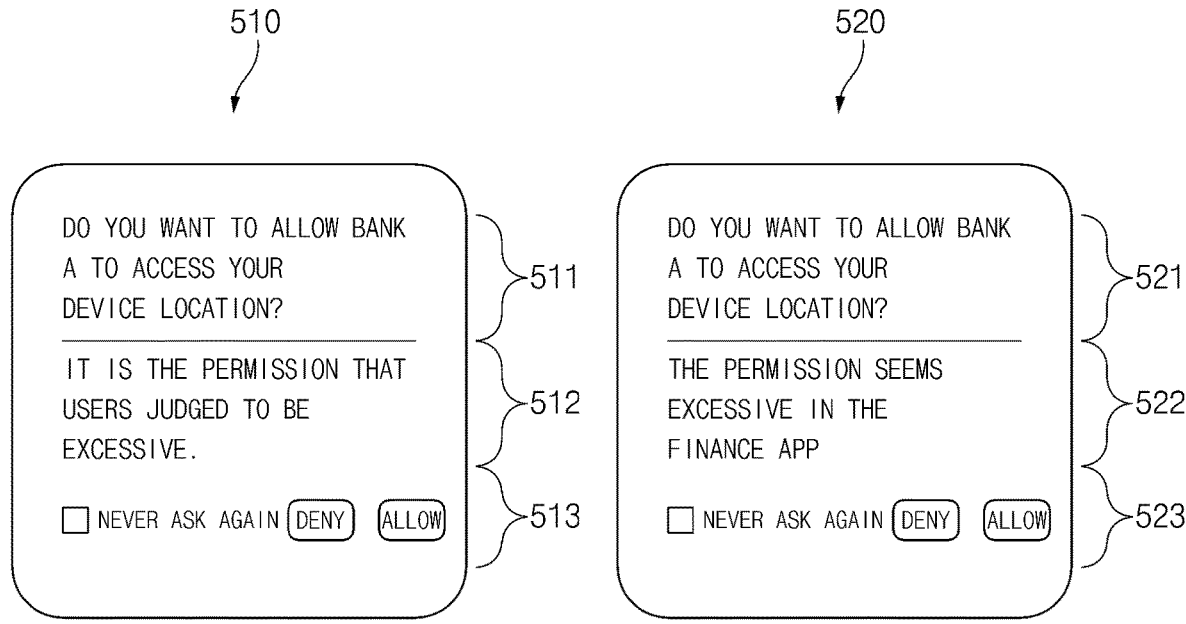
FIG. 5 is a drawing illustrating a user notification of a first type according to certain embodiments.

FIG. 5 is a drawing illustrating a user notification of a first type according to certain embodiments. FIG. 5 is illustrative, but not limited thereto.

Referring to FIG. 5, when an application is installed and is executed for the first time or initially uses a specified permission, a processor 120 may determine a result of evaluating the permission based on first permission evaluation information or second permission evaluation information.

When the evaluated result is negative, the processor 120 may display a user interface 510 or 520, (e.g., of a first type) including the evaluated result. The user interface 510 or 520 of the first type may include a first portion 511 or 521 displaying a prompt as to whether to grant the permission, including an identifier of the application, and an identifier of the permission, a second portion 512 or 522 displaying the message communication a general evaluation of the permission, and a third portion 513 or 523 including one or more objects that are selectable by a user input to indicate a setting (e.g., allow/deny) of the access permission.

For example, when the evaluated result by the user evaluation is the negative evaluation, the processor 120 may display the second portion 512, "It is the permission that users judged to be excessive."

For another example, when the evaluated result by the category evaluation is the negative evaluation, the processor 120 may display the second portion 522, "The work seems excessive in the finance app."

It is illustratively shown in FIG. 5 that the evaluated result is simply displayed on the second portion 512 or 522, but not limited thereto. For example, the processor 120 may display a detailed numerical value on the second portion 512 or 522 (e.g., "It is the permission that 90% of users judged to be excessive.") or may display a button for displaying separate additional information on the second portion 512 or 522.

According to an embodiment, when the result of evaluating the permission is a positive evaluation, the processor 120 may display a user interface (not shown) of a second type including a first portion displaying whether to grant the permission and a third portion receiving a user input about a setting (allow/deny) of the permission. The second user interface may fail to include the result of evaluating the permission.

According to certain embodiments, the processor 120 may receive a user input for a permission setting, using a third portion 513 or 523. The processor 120 may grant or deny the permission in response to the user input. The processor 120 may transmit application information, permission information, or a permission setting result about whether to grant the permission to a server 108 to be used as first permission evaluation information. As a result, when another user sets a permission of the application, the server 108 may refer to accumulated first permission evaluation information. It may be useful to set a permission of an application which has low utilization or is unfamiliar to the user.

According to certain embodiments, the processor 120 may transmit a permission setting result except for personal information capable of specifying the user to the server 108 to protect the personal information. Furthermore, the processor 120 may store the permission setting result in the internal memory 130 and may use it as second permission evaluation information.

Figure 6:
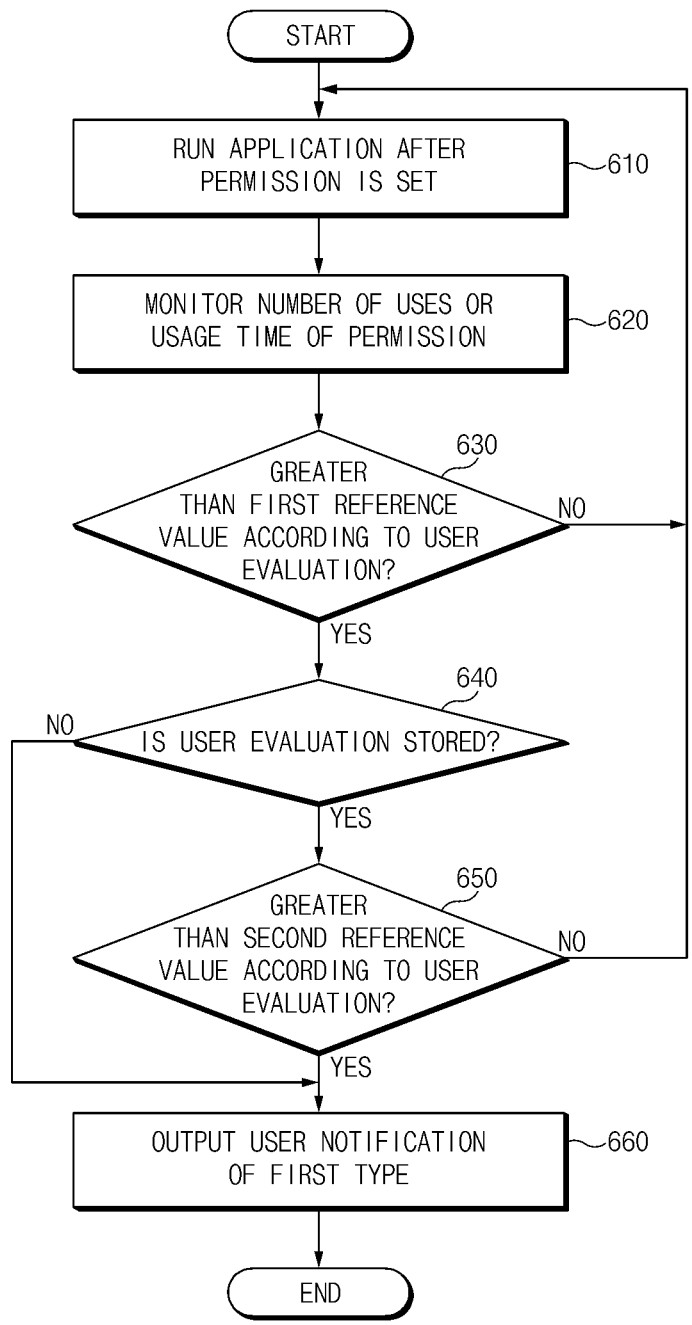
FIG. 6 illustrates a permission control method for changing a permission grant, after a permission is granted to an application, according to certain embodiments.

FIG. 6 illustrates a permission control method for changing a permission grant, after a permission is granted to an application, according to certain embodiments. FIG. 6 is illustrative, but not limited thereto.

Referring to FIG. 6, in operation 610, a processor 120 may execute an application after at least one access permission is granted to the application. As the at least one access permission is already granted to the application (and because the application utilizes the access permission in its normal operations), the application may thus be in use, or may be in a usable state.

In operation 620, the processor 120 may monitor at least one of the number of individual uses, and/or a total usage time of the access permission granted to the application. The processor 120 may, for example, count the number of uses of the access permission within a specified period (e.g., for a single execution session of the application, or during a preset evaluation time frame, such as 10 minutes, etc.). In some embodiments, the processor 120 may assign a weight to data generated within a recent time period (e.g., within the past 5 days or 10 days).

In operation 630, the processor 120 may identify whether the count of uses of the access permission, or the monitored total usage time of the access permission is greater than a first reference value, according to a usage evaluation. The first reference value may be determined using an external usability evaluation, or an internal usability evaluation. For example, for an app of Bank A, a first reference value (e.g., for 'location information') may be less than 3 accesses within a time span of 10 minutes.

According to an embodiment, when the count of uses or the monitored usage time is less than the first reference value, the processor 120 may continue monitoring (630—NO).

When the number of uses or the usage time is equal to or greater than the first reference value, then in operation 640, the processor 120 may detect whether a user evaluation is already stored.

When the user evaluation is already stored, in operation 650, the processor 120 may determine whether the count of uses or the monitored usage time is greater than a second reference value, as based on the user evaluation.

The second reference value may be determined by using an external user evaluation or an internal user evaluation. For example, for the app of Bank A, a second reference value (e.g., regarding access of 'location information') may be less than 5 accesses within a time span of 10 minutes.

According to an embodiment, when the count of uses or the monitored usage time is less than the second reference value, the processor 120 may continue monitoring (650—NO).

When the user evaluation is not stored (640—NO) or when the count of uses or the monitored usage time is greater than the second reference value (650—YES), in operation 660, the processor 120 may output a user notification of a first type including a guidance message pertaining to the evaluation result. For example, the guidance message may state, "Location information access seems excessive."

According to certain embodiments, the processor 120 may receive a user input for configuring a permission setting, through the user notification of the first type. The processor 120 may maintain the access permission, or deny the access permission, according to the user input. The processor 120 may transmit the permission setting result to a server 108 to be utilized as first permission evaluation information, or as an internal second permission evaluation information.

FIG. 6 illustrates an example case in which a priority is applied to the usability evaluation more than the user evaluation, but the disclosure is not limited thereto. For example, the processor 120 may display results of both the user evaluation and the usability evaluation simultaneously.

Figure 7:
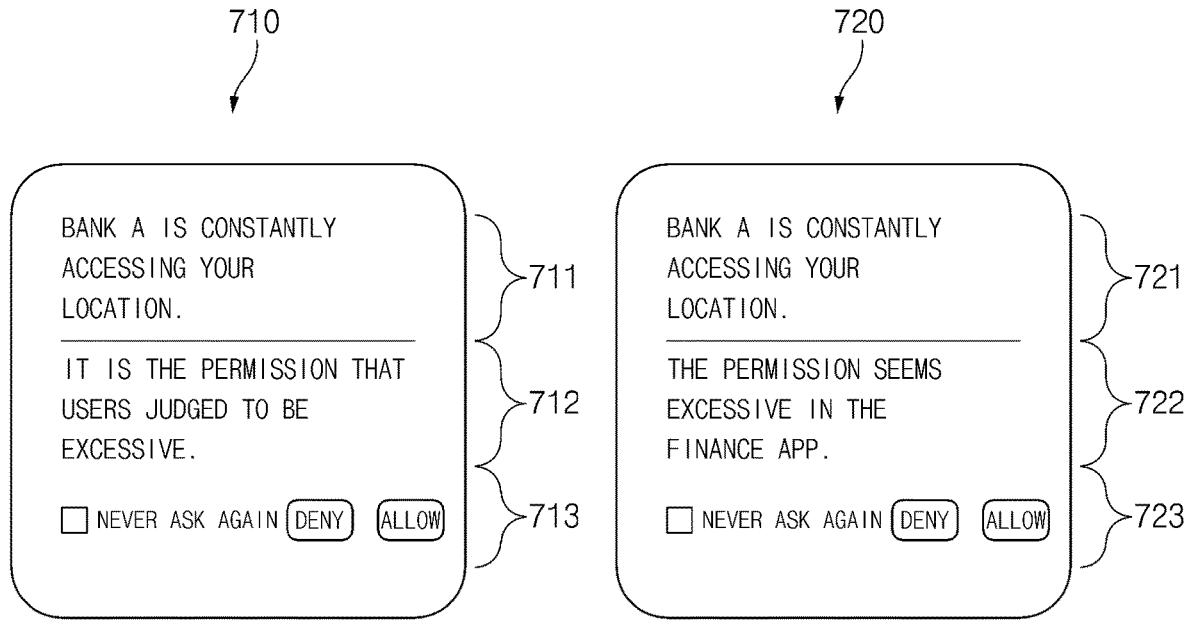
FIG. 7 is a drawing illustrating a user notification of a first type, after a permission is granted, according to certain embodiments.

FIG. 7 is a drawing illustrating a user notification of a first type, after a permission is granted, according to certain embodiments. FIG. 7 is illustrative, but not limited thereto.

Referring to FIG. 7, after access permission is granted to an application, a processor 120 may monitor usage of the access permission, including for example counting a number of individual uses of the access permission, or tracking a total usage time of the access permission granted to the application. The processor 120 may compare a reference value set according to a category evaluation, a user evaluation, or a usability evaluation with the counted number of uses or the tracked usage time. When the number of uses or the usage time is greater than the reference value, then in some embodiments, the processor 120 may display a user notification 710 or 720 of a first type.

The user interface 710 or 720 of the first type may include a first portion 711 or 721 displaying a permission usage state, including an identifier of the application and an identifier of the access permission, a second portion 712 or 722 displaying the result of evaluating the access permission usage state, and a third portion 713 or 723 receiving a user input about a setting (e.g., allow/deny) of the access permission.

For example, the processor 120 may display the first portion 711 or 721, "Bank A app is constantly accessing your location".

For example, when the number of uses or the usage time is greater than a first reference value by a usability evaluation and a second reference value by a user evaluation, the processor 120 may display the second portion 712, "It is the permission that users judged to be excessive."

For another example, when the number of uses or the usage time is greater than the first reference value by the usability evaluation, and when the user evaluation is not stored, the processor 120 may display the second portion 722, "The permission seems excessive in the finance app."

It is illustratively shown in FIG. 7 that the evaluated result is simply displayed on the second portion 712 or 722, but not limited thereto. For example, the processor 120 may display a detailed numerical value on the second portion 712 or 722 (e.g., "It is the permission that 90% of users judged to be excessive.") or may display a button for displaying separate additional information on the second portion 712 or 722.

According to certain embodiments, the processor 120 may receive a user input for a permission setting, by means of a third portion 713 or 723. The processor 120 may grant or deny the permission in response to the user input. The processor 120 may transmit application information, permission information, or a permission setting result about whether to grant the permission to a server 108 to be used as first permission evaluation information.

Figure 8:
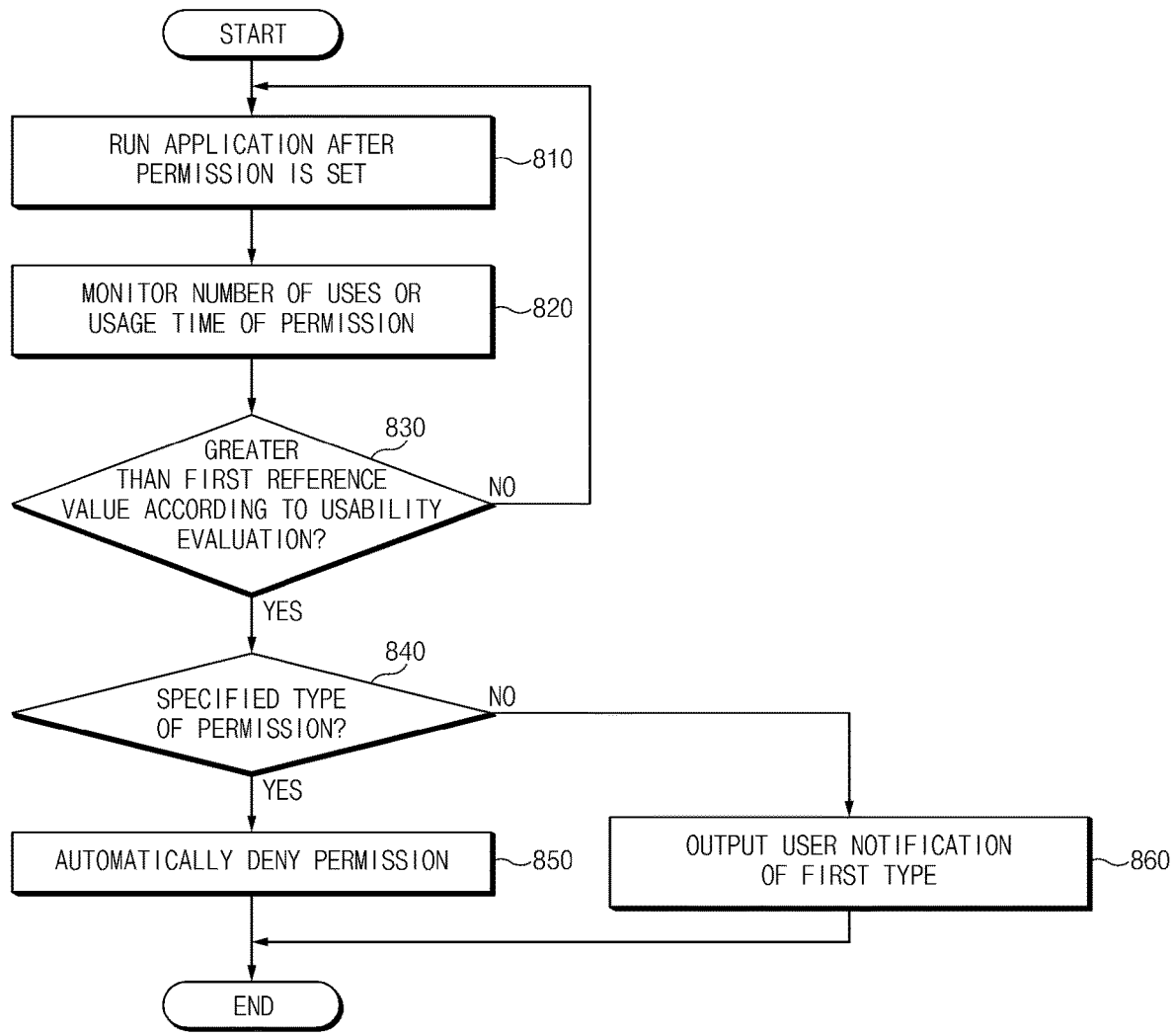
FIG. 8 illustrates an automatic change in permission according to a permission evaluation result according to certain embodiments.

FIG. 8 illustrates an automatic change in permission according to a permission evaluation result according to certain embodiments. FIG. 8 is illustrative, but not limited thereto.

Referring to FIG. 8, operations 810 to 830 may be the same as operations 610 to 630 in FIG. 6.

When the number of uses or a usage time is greater than a first reference value, in operation 840, the processor 120 may identify whether there is a specified type of permission. For example, the specified type may be a permission (e.g., a present position or location) closely associated with personal information.

When the specified type of permission exists, then in operation 850, the processor 120 may automatically deny the access permission without consideration of a user input. The processor 120 may omit output of a separate notification. Alternatively, the processor 120 may output a separate user notification such that a user may revert the automatic rejection of access permission, to maintain the grant of access permission despite the negative indication.

When there is no specified type of permission, in operation 860, a user interface of a first type may be displayed. The processor 120 may output a user notification of a first type including information about the evaluated result. For example, the user notification of the first type may include a guidance message corresponding to a negative result in the evaluation, such as, "Location information access seems excessive."

FIG. 8 illustrates the case where the usage evaluation (e.g., "usability" evaluation) is utilized to evaluate the access permission, but the invention is not limited thereto. The processor 120 may apply a category evaluation, a usability evaluation, and a user evaluation in a complex manner to evaluate the permission.

An electronic device (e.g., an electronic device 101 of FIG. 1) according to certain embodiments may include a display (e.g., a display device 160 of FIG. 1), a communication module (e.g., a communication module 190 of FIG. 1), a memory (e.g., a memory 130 of FIG. 1), and a processor (e.g., a processor 120). The processor (e.g., the processor 120 of FIG. 1) may receive first permission evaluation information about at least one application from a server (e.g., a server 108 of FIG. 1), using the communication module (e.g., the communication module 190 of FIG. 1), may obtain permission usage information of the at least one application in the electronic device (e.g., the electronic device 101 of FIG. 1), may generate second permission evaluation information about the at least one application based on the permission usage information, may determine an evaluated result about granting at least one permission associated with the at least one application based on the first permission evaluation information or the second permission evaluation information, and may display a user notification for the at least one permission on the display (e.g., the display device 160 of FIG. 1), based on the evaluated result.

According to certain embodiments, the first permission evaluation information may include at least one of first evaluation information about a category of the at least one application, second evaluation information about a user who uses the at least one application, or third evaluation information about a usage pattern of the at least one application.

According to certain embodiments, the second permission evaluation information may include at least one of fourth evaluation information about an application installed in the electronic device (e.g., the electronic device 101 of FIG. 1), fifth evaluation information about a user of the electronic device (e.g., the electronic device 101 of FIG. 1), or sixth evaluation information about a usage pattern of the at least one application in the electronic device (e.g., the electronic device 101 of FIG. 1).

According to certain embodiments, the processor (e.g., the processor 120 of FIG. 1) may determine the evaluated result based on the second evaluation information or the fifth evaluation information, when the at least one application is installed and is run for the first time or when the at least one permission is used for the first time and when the second evaluation information or the fifth evaluation information is stored in the memory (e.g., the memory 130 of FIG. 1).

According to certain embodiments, the processor (e.g., the processor 120 of FIG. 1) may determine the evaluated result based on the first evaluation information or the fourth evaluation information, when the second evaluation information or the fifth evaluation information is not stored in the memory (e.g., the memory 130 of FIG. 1).

According to certain embodiments, the processor (e.g., the processor 120 of FIG. 1) may monitor the number of uses or a usage time for the at least one permission, after the at least one permission is set in the at least one application, and may determine the evaluated result based on a first reference value about the third evaluation information or the sixth evaluation information.

According to certain embodiments, the processor (e.g., the processor 120 of FIG. 1) may determine the evaluated result based on the second evaluation information or the fifth evaluation information, when the number of uses or the usage time is greater than the first reference value and when the second evaluation information or the fifth evaluation information is stored in the memory (e.g., the memory 130 of FIG. 1).

According to certain embodiments, the permission usage information may include first history information about installing, running, or deleting the at least one application or second history information about whether to grant the at least one permission, the number of uses for the at least one permission, or the usage time for the at least one permission.

According to certain embodiments, the user notification may include a first portion including an identifier of the at least one application and an identifier of the at least one permission, a second portion including the evaluated result, and a third portion receiving a user input for controlling a setting of the at least one permission.

According to certain embodiments, the processor (e.g., the processor 120 of FIG. 1) may receive the user input from the third portion, may grant or deny the at least one permission in response to the user input, and transmit the result of setting the at least one permission to the server (e.g., the server 108 of FIG. 1) or may store the result of setting the at least one permission as the second permission control information in the memory (e.g., the memory 130 of FIG. 1).

According to certain embodiments, the evaluated result may be one of a positive evaluation or a negative evaluation, and the processor (e.g., the processor 120 of FIG. 1) may display the user notification, when the evaluated result is the negative evaluation.

According to certain embodiments, the processor (e.g., the processor 120 of FIG. 1) may display a separate user notification independent of the user notification, when the evaluated result is the positive evaluation.

According to certain embodiments, the processor (e.g., the processor 120 of FIG. 1) may determine a plurality of reference values based on the first permission evaluation information or the second permission evaluation information and may determine the evaluated result based on the plurality of reference values.

According to certain embodiments, the first permission evaluation information may include a reference value associated with evaluating the at least one permission.

A permission control method performed in an electronic device (e.g., an electronic device 101 of FIG. 1) according to certain embodiments may include receiving first permission evaluation information about at least one application from a server (e.g., a server 108 of FIG. 1), obtaining permission usage information of the at least one application in the electronic device (e.g., the electronic device 101 of FIG. 1), generating second permission evaluation information about the at least one application based on the permission usage information, determining an evaluated result about granting at least one permission associated with the at least one application based on the first permission evaluation information or the second permission evaluation information, and displaying a user notification for the at least one permission on a display (e.g., a display device 160 of FIG. 1) of the electronic device (e.g., the electronic device 101 of FIG. 1), based on the evaluated result.

According to certain embodiments, the first permission evaluation information may include at least one of first evaluation information about a category of the at least one application, second evaluation information about a user who uses the at least one application, or third evaluation information about a usage pattern of the at least one application.

According to certain embodiments, the second permission evaluation information may include at least one of fourth evaluation information about an application installed in the electronic device (e.g., the electronic device 101 of FIG. 1), fifth evaluation information about a user of the electronic device (e.g., the electronic device 101 of FIG. 1), or sixth evaluation information about a usage pattern of the at least one application in the electronic device (e.g., the electronic device 101 of FIG. 1).

According to certain embodiments, the determining of the evaluated result may include determining the evaluated result based on the second evaluation information or the fifth evaluation information, when the at least one application is installed and is run for the first time, or when the at least one permission is used for the first time and when the second evaluation information or the fifth evaluation information is stored in the memory (e.g., the memory 130 of FIG. 1).

According to certain embodiments, the determining of the evaluated result may include determining the evaluated result based on the first evaluation information or the fourth evaluation information, when the second evaluation information or the fifth evaluation information is not stored in the memory (e.g., the memory 130 of FIG. 1).

According to certain embodiments, the permission usage information may include first history information about installing, running, or deleting the at least one application or second history information about whether to grant the at least one permission, the number of uses for the at least one permission, or the usage time for the at least one permission.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device, comprising:
a display;
a communication circuitry;
at least one processor;
memory operatively connected to the display, the communication circuitry, and the at least one processor, the memory storing a plurality of executable instructions, wherein execution of the plurality of executable instructions by the at least one processor causes the electronic device to perform a plurality of operations comprising:
receiving a first evaluation regarding usage of an access permission by at least one application from a server, via the communication circuitry, wherein the access permission comprises permission for the at least one application to access at least one of a specified function, a module, an internal component, or a hardware resource of the electronic device,
generating usage information indicating historical usage of the access permission by the at least one application,
generating a second evaluation of the access permission granted to the at least one application, based at least on the usage information,
determining an evaluation result based on at least one of the first evaluation or the second evaluation, and
determining whether to display a user notification regarding the access permission, based on the evaluation result.

2. The electronic device of claim 1, wherein the first evaluation includes at least one of a first sub-evaluation regarding a category of the at least one application, second sub-evaluation regarding a user of the at least one application, or third sub-evaluation regarding a usage pattern of the at least one application.

3. The electronic device of claim 2, wherein the second evaluation includes at least one of a fourth sub-evaluation regarding the category, a fifth sub-evaluation regarding the user, or a sixth sub-evaluation about the usage pattern.

4. The electronic device of claim 3, wherein determining the evaluation result is further based on the second sub-evaluation or the fifth sub-evaluation, and
wherein the evaluation result is generated when the at least one application is installed and executed for a first time, or when the access permission is utilized for the first time while the second sub-evaluation or the fifth sub-evaluation is stored in the memory.

5. The electronic device of claim 4, wherein the evaluation result is further based on the first sub-evaluation or the fourth sub-evaluation, when the second sub-evaluation or the fifth sub-evaluation is not stored in the memory.

6. The electronic device of claim 3,
wherein the third sub-evaluation or the sixth-sub-evaluation further includes counting a number of times that the at least one application utilizes the access permission, or tracking a total usage time for which the access permission is utilized by the at least one application, after the access permission is granted to the at least one application,
wherein the evaluation result is further based on a comparison of the third sub-evaluation or the sixth sub-evaluation against a first reference value indicating at least one of a threshold access count or a threshold access time.

7. The electronic device of claim 6, wherein the evaluation result is further based on the second sub-evaluation or the fifth sub-evaluation, when the count or the total usage time is greater than the first reference value, and when the second sub-evaluation or the fifth sub-evaluation is stored in the memory.

8. The electronic device of claim 1, wherein the usage information includes at least one of:
   first history information indicating at least one of installation, execution or deletion of the at least one application; or
   second history information indicating whether the access permission is granted to the at least one application, a total count of uses of the access permission, or a total usage time of the access permission by the at least one application.

9. The electronic device of claim 1, wherein the user notification includes an identifier of the at least one application and an identifier of the access permission, the evaluation result, and a one or more display objects selectable via user input to control configuration of the access permission.

10. The electronic device of claim 9, wherein the at least one processor is configured to:
    detect the user input selecting the one or more display objects;
    configure the access permission including maintaining or denying the access permission to the at least one application, based on the user input; and
    transmit the configured access permission to the server, or store the configured access permission as the second evaluation in the memory.

11. The electronic device of claim 9, wherein the evaluation result is one of a positive evaluation or a negative evaluation, and
    wherein the at least one processor is configured to display the user notification when the evaluated result is the negative evaluation.

12. The electronic device of claim 11, wherein the at least one processor is further configured to display a second notification different from the user notification when the evaluated result is the positive evaluation.

13. The electronic device of claim 1, wherein the plurality of operations further comprises:
    determining a plurality of reference values based on the first evaluation or the second evaluation,
    wherein the evaluation result is based at least in part on the determined plurality of reference values.

14. The electronic device of claim 1, wherein the first evaluation includes an access permission evaluation reference value associated with evaluating the access permission.

15. A permission control method in an electronic device, comprising:
    receiving, from a server via a communication circuit, a first evaluation regarding usage of an access permission by at least one application;
    generating, via at least one processor, usage information indicating historical usage of the access permission by the at least one application, wherein the access permission comprises permission for the at least one application to access at least one a specified function, a module, an internal component, or a hardware resource of the electronic device;
    generating a second evaluation of the access permission granted to the at least one application, based at least on the usage information;
    determining an evaluation based on at least one of the first evaluation or the second evaluation; and
    displaying, via a display, a user regarding the access permission, based on result of the evaluation.

16. The permission control method of claim 15, wherein the first evaluation includes at least one of a first sub-evaluation regarding a category of the at least one application, second sub-evaluation regarding a user of the at least one application, or third sub-evaluation regarding a usage pattern of the at least one application.

17. The permission control method of claim 16, wherein the second evaluation includes at least one of a fourth sub-evaluation regarding the category, a fifth sub-evaluation regarding the user, or a sixth sub-evaluation about the usage pattern.

18. The permission control method of claim 17, wherein determining the result of the evaluation is further based on the second sub-evaluation or the fifth sub-evaluation, and
    wherein the evaluation result is generated when the at least one application is installed and executed for a first time, or when the access permission is utilized for the first time while the second sub-evaluation or the fifth sub-evaluation is stored in a memory.

19. The permission control method of claim 18, wherein the result of the evaluation is further based on the first sub-evaluation or the fourth sub-evaluation, when the second sub-evaluation or the fifth sub-evaluation is not stored in the memory.

20. The permission control method of claim 15, wherein the usage information includes at least one of:
    first history information indicating at least one of installation, execution or deletion of the at least one application; or
    second history information indicating whether the access permission is granted to the at least one application, a total count of uses of the access permission, or a total usage time of the access permission by the at least one application.

* * * * *